Figure 1:
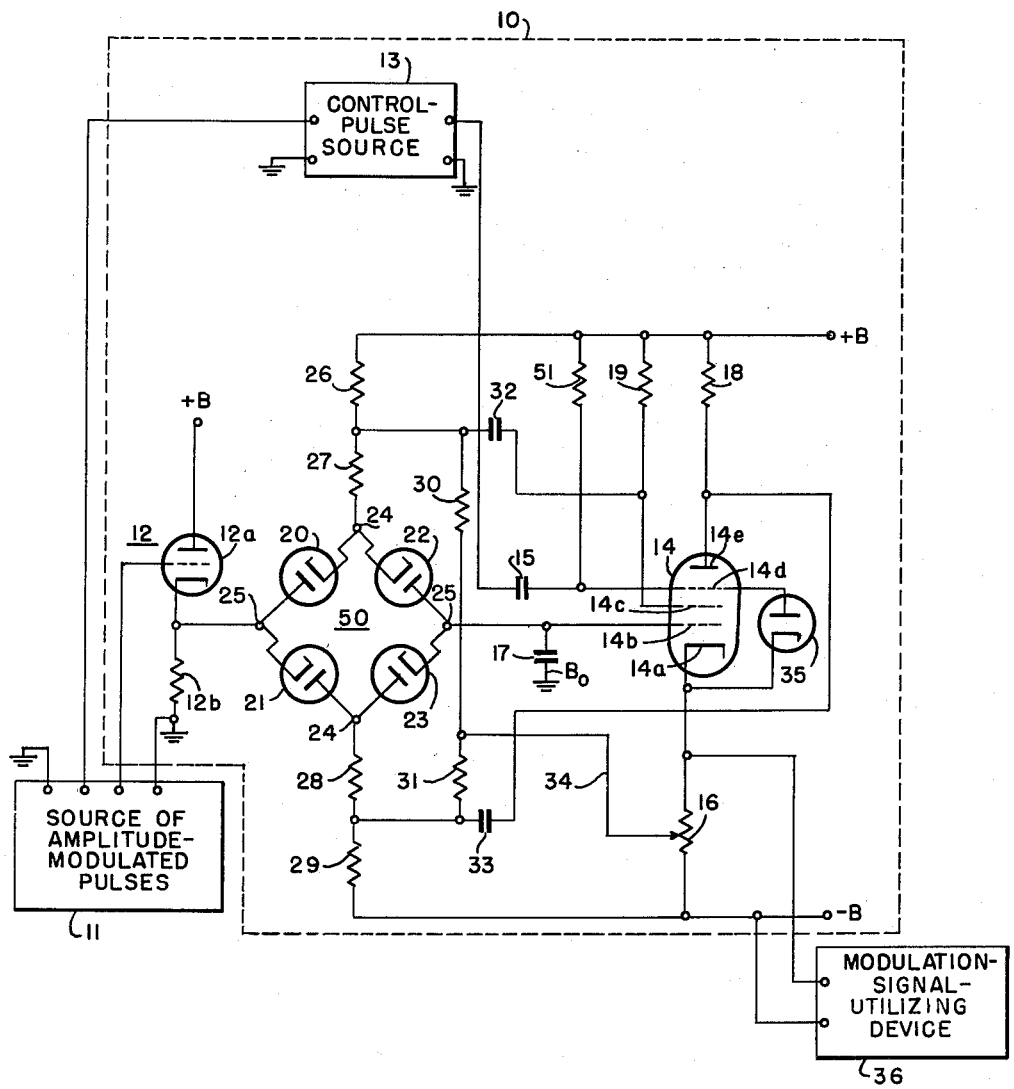

April 30, 1957   R. H. KIRKNESS ET AL   2,790,903
SIGNAL-TRANSLATING CIRCUIT
Filed Feb. 18, 1953   2 Sheets-Sheet 1

INVENTOR.
ROBERT H. KIRKNESS
ANTHONY B. MORROW
BY
Laurence B. Dodds
ATTORNEY

United States Patent Office 2,790,903
Patented Apr. 30, 1957

2,790,903

SIGNAL-TRANSLATING CIRCUIT

Robert Hylton Kirkness and Anthony Bernard Morrow, Wembley, England, assignors to Hazeltine Research, Inc., Chicago, Ill., a corporation of Illinois Application February 18, 1953, Serial No. 337,627

Claims priority, application Great Britain February 20, 1952

6 Claims. (Cl. 250—27)

General

This invention relates to signal-translating circuits and, more particularly, to such circuits of the type adaptable for use as a synchronous detector. Such a detector is of particular utility in deriving the modulation components of amplitude-modulated pulses of one signal combined in time multiplex with amplitude-modulated pulses of another signal.

One previously proposed signal-translating circuit of the type mentioned utilizes a diode-bridge network keyed into operation by gating pulses applied thereto by a pulse transformer. Such a circuit has the disadvantage that the pulse transformer may not faithfully reproduce the gating pulses because of, for example, the distributed capacitance thereof and may, therefore, cause distortions of the modulation-signal components derived by the circuit. Moreover, signal-translating circuits heretofore proposed of the type utilizing a diode-bridge network ordinarily require the application thereto of gating pulses of greater amplitude than the signals to be translated. Gating pulses of such large amplitude may also render the circuits subject to output-signal distortion, due to, for example, circuit disturbances causing transient variations in the gating-pulse amplitude.

It is an object of the present invention, therefore, to provide a new and improved signal-translating circuit which avoids one or more of the above-mentioned disadvantages and limitations of such circuits heretofore proposed.

It is another object of the invention to provide a new and improved detector for deriving the modulation components of amplitude-modulated pulses which avoids one or more of the above-mentioned disadvantages and limitations of such circuits heretofore proposed.

It is another object of the invention to provide a new and improved signal-translating circuit of the gated-circuit type which eliminates the use of a gating-pulse transformer.

It is another object of the invention to provide a new and improved signal-translating circuit of the gated-circuit type which utilizes a signal electron-discharge device for supplying gating pulses and for repeating a signal derived by the circuit and representative of the translated signal.

It is another object of the invention to provide a new and improved signal-translating circuit which is subject to reduced output-signal distortion caused by circuit disturbances.

In accordance with a particular form of the invention, a signal-translating circuit comprises a first circuit for supplying a signal to be translated and a second circuit for supplying recurrent control pulses. The signal-translating circuit also includes circuit means, including an electron-discharge device having a pair of control electrode-cathode input circuits and having a plurality of output circuits and having one of the input circuits coupled to the aforesaid second circuit, for developing recurrent gating pulses of opposite polarities in two of the aforesaid output circuits. The signal-translating circuit also includes a gated switch circuit coupled between the aforesaid two of the output circuits and coupled between the aforesaid first circuit and the other of the aforesaid input circuits for recurrently applying pulses of the above-mentioned signal to the aforesaid other of the input circuits to develop a signal representative of the above-mentioned signal pulses in one of the output circuits.

For a better understanding of the present invention, together with other and further objects thereof, reference is had to the following description taken in connection with the accompanying drawings, and its scope will be pointed out in the appended claims.

Figure 2:
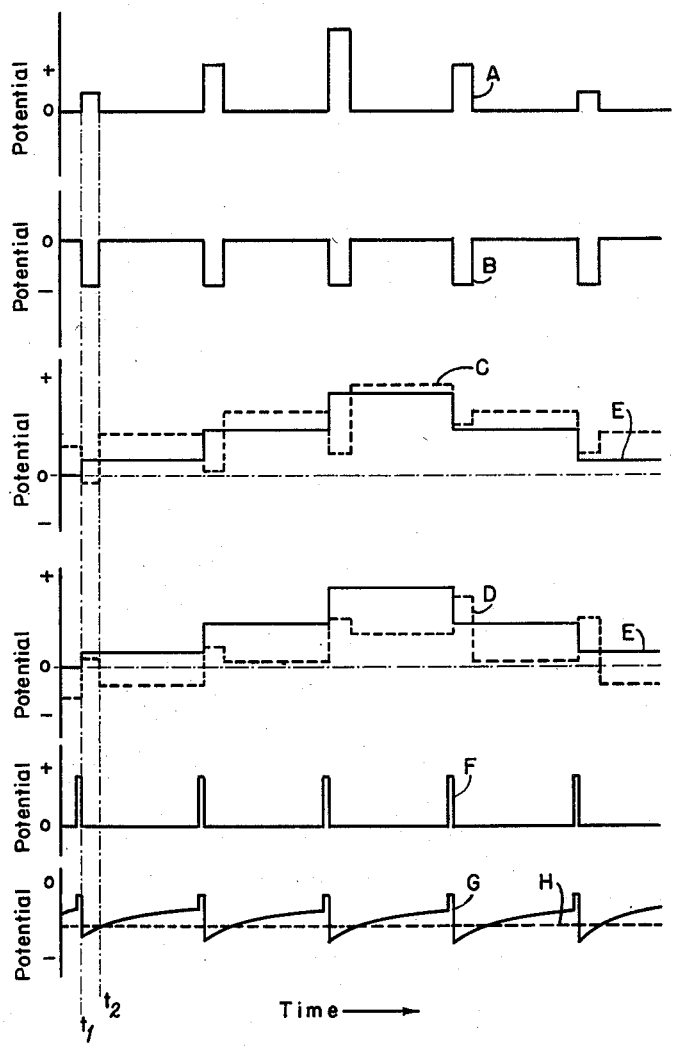

In the accompanying drawings:

Fig. 1 is a circuit diagram, partly schematic, of amplitude-modulated pulse-signal-translating equipment including a signal-translating circuit constructed in accordance with the invention, and Fig. 2 is a graph representing signals developed at various points of the Fig. 1 equipment.

Description of Fig. 1 equipment

Referring now, more particularly, to Fig. 1 of the drawings, there is represented amplitude-modulated pulse-signal-translating equipment including a signal-translating circuit 10 constructed in accordance with the invention and comprising, for example, a detector for deriving the modulation components of amplitude-modulated pulses. The equipment includes a source of amplitude-modulated pulses 11 coupled to a first circuit of the unit 10 for supplying a signal to be translated. The first circuit comprises, for example, a cathode-follower repeater 12 which may be of conventional construction including a tube 12a and cathode load resistor 12b.

The signal-translating circuit 10 also includes a second circuit comprising, for example, a control-pulse source 13 for supplying recurrent control pulses which preferably occur substantially simultaneously with amplitude-modulated pulses supplied by the cathode-follower repeater 12. The source 13 may be of conventional construction comprising, for example, a synchronized multivibrator of the so-called "one-shot" type as described at page 590 of the text "Radio Engineering," third edition, by F. E. Terman, McGraw-Hill, 1947. A synchronizing input circuit of the control-pulse source 13 preferably is connected to an output circuit of the source of amplitude-modulated pulses 11 to assure triggering of the source 13 in synchronism with pulses supplied by the source 11.

The signal-translating circuit 10 also includes circuit means having a pair of input circuits and having a plurality of output circuits. This circuit means preferably comprises an electron-discharge device including an electron tube 14 of the five-electrode type. The tube 14 has a cathode 14a, inner control electrode 14b, inner anode 14c, outer control electrode 14d, and outer anode 14e. The outer control electrode-cathode input circuit of the tube 14 is coupled to the control-pulse source 13 for developing recurrent gating pulses of opposite polarities in two of the output circuits of the tube 14. More particularly, the outer control electrode-cathode circuit is coupled to the source 13 through a network comprising a coupling condenser 15 and grid-leak resistor 51 connected to the outer control electrode 14d and to the positive terminal +B of a source of potential and through a cathode resistor 16 of large value connected to the cathode 14a and to the negative terminal −B of the source of potential. The inner control electrode-cathode input circuit 14b, 14a of the tube 14 includes a pulse-storage condenser 17 coupled between the inner control electrode 14b and an intermediate tap on the source of potential, for example, a zero-potential tap, B₀.

The tube 14 has an outer anode-cathode output circuit including a load resistor 18 coupled between the outer anode 14e of the tube and the positive terminal +B. The tube 14 also has an inner anode-cathode output circuit including a load resistor 19 coupled between the inner anode 14c and the positive terminal +B and preferably having substantially the same resistance as the resistor 18. The outer anode-cathode and inner anode-cathode output circuits have a common cathode portion including the cathode resistor 16. The tube 14 preferably is of the type in which a small change in outer control electrode potential causes a relatively large change of outer anode-cathode current flow. Tubes of this type are sometimes referred to as having a short suppressor-electrode base.

The signal-translating circuit 10 also includes a gated switch circuit coupled between two of the aforesaid output circuits, for example, the outer anode-cathode and inner anode-cathode output circuits and coupled between the first circuit comprising the cathode-follower repeater 12 and the other input circuit comprising the inner control electrode-cathode input circuit 14b, 14a for recurrently applying pulses of the signal to the inner control electrode-cathode input circuit to develop a signal representative of the signal pulses supplied by the source 11 in one of the output circuits of the tube 14, for example, in the common cathode portion of the outer anode-cathode and inner anode-cathode circuits. The switch circuit may, for example, be in the form of a bridge network 50 having two parallel-connected arms individually including, for example, two groups of diode tubes 20, 21 and 22, 23. The diodes 20–23, inclusive, are connected with the same polarity across one diagonal of the bridge network 50 which has a first pair of terminals 24, 24 coupled to a bias potential-supply circuit for maintaining the bridge network 50 nonconductive in the intervals between the gating pulses to cause the bridge network to present during the intervals between the gating pulses a high impedance between a second pair of terminals 25, 25 across the other diagonal of the bridge network and connected to the output circuit of the cathode-follower repeater 12 and to the condenser 17.

The bias potential-supply circuit includes the source of potential +B, −B and resistors 26, 27, 28, 29 coupled in series with the terminals 24, 24 of the bridge network 50. Two additional resistors 30, 31 are connected in series between the junction of the resistors 26 and 27 and the junction of the resistors 28 and 29.

The outer anode-cathode and inner anode-cathode output circuits of the tube 14 also are coupled to the first pair of terminals 24, 24 of the bridge network 50 for applying the recurrent gating pulses thereto to render the bridge network conductive during the intervals of the gating pulses. More particularly, the inner anode 14c is coupled to one of the terminals 24, 24 through a coupling condenser 32 and the resistor 27 and the outer anode 14e is coupled to the other of the terminals 24, 24 through a coupling condenser 33 and the resistor 28. Accordingly, as will be more fully explained hereinafter, the diodes 20–23, inclusive, are so connected that the bridge network presents a low impedance between the terminals 25, 25 for a short period during each gating pulse.

The signal-translating circuit also includes a feed-back circuit coupled between the common cathode portion of the output circuits of the tube 14 and the first pair of terminals 24, 24 of the bridge network 50 for varying the conduction level thereof in accordance with variations of the representative signal developed in the cathode portion of the output circuits to maintain the bridge network 50 nonconductive during the intervals between the gating pulses. More particularly, this feed-back circuit includes a conductor 34 connected between a tap on the cathode resistor 16 and the junction of the resistors 30 and 31.

For some applications, there may also be provided a wave-shaping circuit coupled between the second circuit comprising the control-pulse source 13 and the outer control electrode-cathode input circuit for recurrently biasing the tube 14 to outer anode-cathode current cutoff to develop recurrent gating pulses of positive polarity in the outer anode-cathode circuit and recurrent gating pulses of negative polarity in the inner anode-cathode circuit. The wave-shaping circuit preferably includes the coupling condenser-leak resistor network 15, 51 and a diode 35 having its anode connected to the outer control electrode 14d and its cathode connected to the cathode 14a of the tube 14. The diode 35 is ordinarily included in the signal-translating circuit 10 only when the control-pulse source 13 is of the type which provides output pulses of positive polarity.

A conventional modulation-signal-utilizing device 36 may be connected across the cathode resistor 16 of the signal-translating circuit 10.

Operation of Fig. 1 equipment

Considering now the operation of the equipment, it will be assumed initially that the control pulse source 13 generates pulses of negative polarity substantially simultaneously with the amplitude-modulated pulses supplied by the source 11. Accordingly, the presence of diode 35 may be neglected while considering these operating conditions.

Referring now more particularly to Fig. 2 of the drawings, curve A represents the amplitude-modulated pulses supplied by the source 11 as they are developed across the cathode load resistor 12b of the cathode-follower repeater 12. Curve B represents output pulses of the control-pulse source 13 which are supplied to the outer control electrode-cathode circuit of the tube 14.

As mentioned previously, during the intervals between the control pulses supplied by the source 13, because of the positive bias potential applied to the cathodes of the diodes 20, 22 and the negative bias potential applied to the anodes of the diodes 23, 21, the diode-bridge network 50 is nonconductive and the cathode-follower repeater 12 is thereby isolated from the inner control electrode-cathode input circuit 14b, 14a of the tube 14. During the intervals between the control pulses supplied by the source 13, inner anode-cathode current and outer anode-cathode current flow in the tube 14.

Upon the occurrence of a control pulse at, for example, a time $t_1$, the outer control-electrode potential decreases sufficiently to reduce the outer anode-cathode current flow through the tube 14 and the resistor 18 substantially to zero, thereby causing the outer anode potential to rise to the potential +B. At this time, the electron flow through the tube 14 is directed to the inner anode 14c and flows through the resistor 19 so that the increase in the outer anode potential of the tube 14 is accompanied by a decrease in the inner anode potential thereof. Because of the large value of the resistor 16, the total space-current flow through the tube 14 is substantially unaffected by such variations of the outer anode and inner anode potentials thereof. Accordingly, since the resistors 19 and 18 have substantially the same resistance, the changes in the outer anode and inner anode potentials are of substantially the same magnitude, but are of opposite polarity. The outer anode and inner anode potential variations constitute positive and negative gating pulses, respectively, utilized to render the diode-bridge network 50 conductive, and are supplied to the junctions of the resistors 28 and 29, and the resistors 26 and 27, through the condensers 33 and 32, respectively. Accordingly, upon the occurrence of a gating pulse, the potential at the junction of the resistors 26 and 27 falls, while the potential at the junction of the resistors 28 and 29 rises, as indicated at the time $t_1$ by broken line curves C and D, respectively.

When the potential at the junction of the resistors 26 and 27 falls below the potential at the cathode of the cathode-follower repeater 12, the diode 20 conducts. Current then flows from the source +B through the repeater tube 12a, the diode 20, the resistor 27, the condenser 32, the inner anode 14c, the cathode 14a, and the resistor 16 to the source —B. Since the diode 20 has a very low conductive impedance, the potential at the cathode of the tube 20 becomes approximately the same as the potential at the resistor 12b of the cathode-follower repeater 12.

Also at the time $t_1$, the positive pulse derived at the outer anode 14e of the tube 14 causes the anode potential of the diode 23 to rise above the cathode potential thereof, rendering the diode 23 conductive. Current then flows from the source +B through the resistor 18, the condenser 33, the resistor 28, the diode 23, and the condenser 17 to the tap B₀ of the source of potential +B, —B. Accordingly, the condenser 17 charges, causing the potential at the inner control electrode 14b to rise, as indicated by solid-line curve E which, for convenience, is represented twice on the graph of Fig. 2. Outer anode-cathode current flow through the tube 14 then increases and, therefore, the potential at the cathode of the tube 14 rises. Hence, the potential applied by the feed-back circuit 34 to the junction of the resistors 30 and 31 also rises and causes the potential at the anode of the diode 23 to rise, resulting in additional charging of the condenser 17. This action occurs rapidly with the result that the potential at the inner control electrode of the tube 14b becomes slightly more positive than the potential at the cathode of the diode 22. The diode 22 then is rendered conductive and current flows from the source +B through the resistor 18, the condenser 33, the resistor 28, the diode 23, the diode 22, the resistor 27, the condenser 32, the inner anode 14c, the cathode 14a, and the resistor 16, to the source terminal —B. Because of the low conductive impedance of the diode 22, the potential at the inner control electrode of the tube 14 becomes approximately the same as the potential at the cathode of the diode 22 which, in turn, is approximately the same as the potential at the output circuit of the cathode-follower repeater 12. Similarly, because of the low conductive impedance of the diode 23, the potential at the anode thereof becomes approximately the same as the potential at the cathode thereof. During the interval of the gating pulse, the diode 21 also conducts because the potential at the anode thereof is slightly more positive than the potential at the cathode thereof although these potentials are approximately the same.

From the foregoing explanation, it will be seen that during the interval of a gating pulse, the condenser 17 charges to a potential approximately equal to the potential of the pulse simultaneously supplied by the cathode-follower repeater 12. At the termination of the gating pulse, for example the time $t_2$, the condenser 17 remains charged to this potential, as represented by curve E. Accordingly, there is derived across the condenser 17 a signal representative of the modulation components of the amplitude-modulated pulses supplied by the source 11. A signal having a potential level approximately equal to the potential at the inner control electrode of the tube 14 is derived in the cathode circuit of the tube 14.

Upon the occurrence of each subsequent gating pulse, the potential developed across the condenser 17 changes in a manner similar to that previously explained approximately to equalize the potential at the inner control electrode 14b of the tube 14 with the potential at the output circuit of the cathode-follower repeater 12. In this manner there is derived across the cathode resistor 16 a signal representative of the modulation components of the amplitude-modulator pulses supplied by the source 11 for application to the modulation-signal-utilizing device which may utilize the same in a conventional manner. A major portion of the signal derived across the resistor 16 is supplied by the feed-back conductor 34 to the junction of the resistors 30 and 31 to vary the conduction level of the diode-bridge network 50 in accordance with variations of the derived signal. Because of the feedback signal, the potential at the junction of the resistors 30 and 31 is maintained approximately equal to that stored by the condenser 17. Accordingly, as indicated by curves C and D, the potentials at the junctions of the resistors 26, 27 and 28, 29, respectively, vary in accordance with variations of the potential across the condenser 17, represented by curve E, with the result that a relatively small bias potential is required to prevent the diodes from becoming conductive during the intervals between gating pulses. Thus, gating pulses of relatively small amplitude may be utilized to render the diodes conductive.

It will be understood that if the feed-back conductor 34 were omitted, a relatively large bias potential would be required to maintain the diodes nonconductive during the intervals between gating pulses because the potential stored by the condenser 17 would otherwise be sufficient to render the diode 22 conductive during intervals between gating pulses.

In the event that the control-pulse source supplies pulses of positive polarity through the condenser 15 to the inner anode-cathode circuit of the tube 14, the diode 35 may be connected as previously described between the outer control electrode 14d and the cathode 14a of the tube 14. During each positive control pulse supplied by the source 13, such as represented by curve F, the diode discharges the condenser 15 and prevents the outer control electrode potential from exceeding the cathode potential of the tube 14. Accordingly, upon the termination of the pulse, when the diode 35 becomes nonconductive, the potential on the outer control electrode 14d rises exponentially as the condenser 15 charges positively through the resistor 51. Under these operating conditions the outer control electrode potential may, for example, vary in the manner represented by curve G. By suitable choice of the values of the condenser 15 and the resistor 51, the outer control electrode 14d may be maintained at a relatively low potential below outer anode-cathode current cutoff, indicated by a broken line H, for an appreciable time interval $t_1-t_2$ with the result that substantially no current flows through the resistor 18 for a period considerably longer than that of the original positive pulse applied by the source 13. The control pulse supplied by the source 13 through the condenser 15 may, for example, occur at a frequency of approximately 250 per second and each pulse may, for example, have a duration of approximately 2 microseconds and be lengthened in the manner just described to approximately 40 microseconds.

While applicants do not wish to be limited to any particular circuit constants, the following have been employed in a signal-translating circuit constructed in accordance with the invention:

| | |
|---|---|
| Resistors 18 and 19_____kilohms__ | 10 |
| Resistors 26 and 29_____megohm__ | 1 |
| Resistors 27, 28, 30, 31_____kilohms__ | 100 |
| Source terminal +B relative to tap B₀____volts__ | +250 |
| Source terminal —B relative to tap B₀____do____ | —250 |
| Condenser 17_____microfarad__ | .001 |

The arm of the diode-bridge network 50 formed by the diodes 22 and 23 preferably has a high resistance when the bridge network is nonconductive to provide a large leakage resistance for the condenser 17. Accordingly, the diodes 22 and 23 preferably comprise diode electron tubes. The other diodes 20 and 21 need not have such a high non-conductive resistance and accordingly may, for example, comprise either diode tubes or crystal rectifiers.

In the event that the source of amplitude-modulated pulses 11 supplies amplitude-modulated pulse signals which are combined in time multiplex, the control pulse source 13 may comprise, for example, an unsymmetrical, unbalanced multivibrator of conventional construction synchronized with pulses of one of the amplitude-modulated pulse signals. A multivibrator of this type is described at pages 586–590, inclusive, of the above-mentioned Terman text. Several units similar to the unit 10 may then be coupled to the source 11 and the individual control-pulse sources thereof may be correctly phased to select the appropriate modulated pulses in the time-multiplex signal supplied by the source 11 to derive the modulation components thereof.

From the foregoing description, it will be seen that a signal-translating circuit constructed in accordance with the invention has the advantages of eliminating pulse transformers and of utilizing gating pulses of relatively small amplitude to reduce output-signal distortion. Further, a single electron-discharge device may be utilized to develop gating pulses of opposite polarity and also to repeat the modulation components derived by the circuit.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A detector for deriving the modulation components of amplitude-modulated pulses comprising: a first circuit for supplying amplitude-modulated pulses having modulation components to be detected; a second circuit for supplying recurrent control pulses substantially simultaneously with said amplitude-modulated pulses; circuit means, including an electron-discharge device of the five-electrode type having an outer control electrode-cathode input circuit and an inner control electrode-cathode input circuit including a pulse-storage condenser and having outer anode-cathode and inner anode-cathode output circuits having a common cathode portion and having said outer control electrode-cathode input circuit coupled to said second circuit, for controlling the relative values of outer anode-cathode and inner anode-cathode current flow to develop recurrent gating pulses of opposite polarities in said outer anode-cathode and inner anode-cathode output circuits; and a gated switch circuit comprising a diode-bridge network having a first pair of terminals coupled between said outer anode-cathode and inner anode-cathode output circuits and a second pair of terminals coupled between said first circuit and said inner control electrode-cathode input circuit for recurrently applying said amplitude-modulated pulses to said inner control electrode-cathode input circuit to develop across said condenser a signal representative of said modulation components for translation to said common cathode portion of said output circuits.

2. A signal-translating circuit comprising: a first circuit for supplying a signal to be translated; a second circuit for supplying recurrent control pulses; circuit means, including an electron-discharge device having a pair of control electrode-cathode input circuits and having a plurality of output circuits and having one of said input circuits coupled to said second circuit, for developing recurrent gating pulses of opposite polarities in two of said output circuits; and a gated switch circuit coupled between said two of said output circuits and coupled between said first circuit and the other of said input circuits for recurrently applying pulses of said signal to said other of said input circuits to develop a signal representative of said signal pulses in one of said output circuits.

3. A signal-translating circuit comprising: a first circuit for supplying a signal to be translated; a second circuit for supplying recurrent control pulses; circuit means, including an electron-discharge device of the five-electrode type having outer control electrode-cathode and inner control electrode-cathode input circuits and having a plurality of output circuits including outer anode-cathode and inner anode-cathode output circuits and having said outer control electrode-cathode input circuit coupled to said second circuit, for controlling the relative values of outer anode-cathode and inner anode-cathode current flow to develop recurrent gating pulses of opposite polarities in said outer anode-cathode and inner anode-cathode output circuits; and a gated switch circuit coupled between said outer anode-cathode and inner anode-cathode output circuits and coupled between said first circuit and said inner control electrode-cathode input circuit for recurrently applying pulses of said signal to said inner control electrode-cathode input circuit to develop a signal representative of said signal pulses in one of said output circuits.

4. A signal-translating circuit comprising: a first circuit for supplying a signal to be translated; a second circuit for supplying recurrent control pulses; circuit means, including an electron-discharge device of the five-electrode type having outer control electrode-cathode and inner control electrode-cathode input circuits and having outer anode-cathode and inner anode-cathode output circuits having a common cathode portion and having said outer control electrode-cathode input circuit coupled to said second circuit, for controlling the relative values of outer anode-cathode and inner anode-cathode current flow to develop recurrent gating pulses of opposite polarities in said outer anode-cathode and inner anode-cathode output circuits; and a gated switch circuit coupled between said outer anode-cathode and inner anode-cathode output circuits and coupled between said first circuit and said inner control electrode-cathode input circuit for recurrently applying pulses of said signal to said inner control electrode-cathode input circuit to develop a signal representative of said signal pulses in said common cathode portion of said output circuits.

5. A signal-translating circuit comprising: a first circuit for supplying a signal to be translated; a second circuit for supplying recurrent control pulses; circuit means, including an electron-discharge device having a pair of control electrode-cathode input circuits and having a plurality of output circuits and having one of said input circuits coupled to said second circuit, for developing recurrent gating pulses of opposite polarities in two of said output circuits; a diode-bridge network having first and second pairs of terminals; a bias-potential supply circuit coupled to said first pair of terminals for maintaining said bridge network nonconductive in the intervals between said gating pulses; said two of said output circuits also being coupled to said first pair of terminals for applying said recurrent gating pulses thereto to render said bridge network conductive during the intervals of said gating pulses; said first circuit and the other of said input circuits being coupled to said second pair of terminals for recurrently applying pulses of said signal to said other of said input circuits to develop a signal representative of said signal pulses in one of said output circuits; and a feed-back circuit coupled between said one of said output circuits and said first pair of terminals of said bridge network for varying the conduction level thereof in accordance with variations of said representative signal to maintain said bridge network nonconductive during said intervals between said gating pulses.

6. A signal-translating circuit comprising: a first circuit for supplying a signal to be translated; a second circuit for supplying recurrent control pulses; circuit means, including an electron-discharge device of the five-electrode type having a pair of control electrode-cathode input circuits and having a pair of anode-cathode output circuits having a common cathode portion and having one of said input circuits coupled to said second circuit, for developing recurrent gating pulses of opposite polarities in said output circuits; a diode-bridge network having first and second pairs of terminals; a bias-potential supply circuit coupled to said first pair of terminals for maintaining said bridge network nonconductive in the intervals between said gating pulses; said two of said output circuits also being coupled to said first pair of terminals for applying said recurrent gating pulses thereto to render said bridge network conductive during the intervals of said gating pulses; said first circuit and the other of said input circuits being coupled to said second pair of terminals for recurrently applying pulses of said signal to said other of said input circuits to develop a signal representative of said signal pulses in one of said output circuits; and a feed-back circuit coupled between said cathode portion of said output circuits and said first pair of terminals of said bridge network for varying the conduction level thereof in accordance with variations of said representative signal to maintain said bridge network nonconductive during said intervals between said gating pulses.

References Cited in the file of this patent
UNITED STATES PATENTS

| | | |
|---|---|---|
| 2,443,195 | Pensyl | June 15, 1948 |
| 2,500,536 | Goldberg | Mar. 14, 1950 |
| 2,532,338 | Schlesinger | Dec. 5, 1950 |
| 2,563,406 | Goldberg | Aug. 7, 1951 |

OTHER REFERENCES

M. I. T. Radar School Staff, "Principles of Radar."